(12) United States Patent
Lee et al.

(10) Patent No.: US 7,879,961 B2
(45) Date of Patent: Feb. 1, 2011

(54) RESIN COMPOSITION FOR ORGANIC INSULATING LAYER, METHOD OF MANUFACTURING RESIN COMPOSITION, AND DISPLAY PANEL INCLUDING RESIN COMPOSITION

(75) Inventors: Dong-Ki Lee, Seoul (KR); Byung-Uk Kim, Hwaseong-si (KR); Hyoc-Min Youn, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 1035 days.

(21) Appl. No.: 11/670,700

(22) Filed: Feb. 2, 2007

(65) Prior Publication Data

US 2007/0184293 A1    Aug. 9, 2007

(30) Foreign Application Priority Data

Feb. 3, 2006   (KR) .................... 10-2006-0010503

(51) Int. Cl.
*C08F 4/04* (2006.01)
(52) U.S. Cl. .................... 526/218.1; 526/273; 526/281; 526/283; 526/317.1; 526/318.2; 526/319; 526/320; 526/328.5; 526/329.2; 526/329.6; 526/347
(58) Field of Classification Search ............... 526/218.4, 526/273, 281, 283, 317.1, 318.2, 319, 320, 526/328.5, 329.2, 329.6, 347, 218.1
See application file for complete search history.

(56) References Cited

U.S. PATENT DOCUMENTS

| 4,963,617 A | 10/1990 | Fourquier et al. |
| 5,530,036 A | 6/1996 | Sano et al. |
| 5,962,571 A | 10/1999 | Overbeek et al. |
| 6,727,314 B2 | 4/2004 | Burghart et al. |
| 6,984,706 B2 | 1/2006 | Karato et al. |
| 2006/0275700 A1 * | 12/2006 | Lee et al. .................. 430/270.1 |

FOREIGN PATENT DOCUMENTS

| CN | 1495477 A | 5/2004 |
| CN | 1693322 A | 11/2005 |
| GB | 2242434 | 10/1991 |
| KR | 199116783 | 11/1991 |
| KR | 1020030097392 | 12/2003 |
| KR | 1020040091123 | 10/2004 |
| WO | WO 2004/097522 A1 * | 11/2004 |

* cited by examiner

*Primary Examiner*—Bernard Lipman
(74) *Attorney, Agent, or Firm*—Cantor Colburn LLP

(57) ABSTRACT

Disclosed herein is a resin composition for an organic insulating layer, a method of manufacturing the same, and a display panel including an insulating layer formed using the resin composition. The resin composition for an organic insulating layer is produced by polymerizing about 5 to about 35 wt % of an unsaturated carboxylic acid, an unsaturated carboxylic acid anhydride, or a mixture of the unsaturated carboxylic acid and the unsaturated carboxylic acid anhydride, about 5 to about 40 wt % of a styrene compound, about 5 to about 40 wt % of an epoxy compound, about 0.1 to about 10 wt % of an isobornyl compound, and about 20 to about 40 wt % of a dicyclopentadiene compound, based on the total weight of unsaturated carboxylic acid, unsaturated carboxylic acid anhydride, styrene compound, isobornyl compound, and dicyclopentadiene compound.

18 Claims, 15 Drawing Sheets

RESIN COMPOSITION FOR ORGANIC INSULATING LAYER, METHOD OF MANUFACTURING RESIN COMPOSITION, AND DISPLAY PANEL INCLUDING RESIN COMPOSITION

This application claims the benefit of Korean Patent Application No. 10-2006-0010503 filed Feb. 3, 2006, and all the benefits accruing therefrom under 35 USC §119, the content of which is incorporated herein by reference in its entirety.

BACKGROUND OF THE INVENTION

1. Field of the Invention

The present invention relates to a resin composition for an organic insulating layer, a method of manufacturing the resin composition, and a display panel including the resin composition.

2. Description of the Related Art

A flat panel display, such as a liquid crystal display ("LCD") or an organic light emitting diode ("OLED") display, includes a plurality of conductive layers or a semiconductor layer, and an insulating layer that insulates them.

The insulating layer may be made of organic or inorganic material. Since an organic insulating layer has transmittance that is higher than that of an inorganic insulating layer, it is possible to increase the viewing angle of the display device and to improve luminance in display devices.

However, an organic insulating layer has poor heat resistance. Accordingly, transmittance and adhesion of the insulating layer can deteriorate while the subsequent processes are performed at high temperatures, and can display characteristic defects such as incidental images which can form due to outgassing of gas due to sublimation from the insulating layer. In addition, the subliming gas may affect other layers, and the generated fumes can cause deterioration in equipment.

BRIEF SUMMARY OF THE INVENTION

To overcome the above limitations of the prior art, provided herein is a resin composition for an organic insulating layer, a method of manufacturing the same, and a display panel including the resin composition. An organic insulating layer as disclosed herein can advantageously improve the heat resistance of the organic insulating layer.

In an embodiment, a resin composition for an organic insulating layer is provided that is produced by polymerizing about 5 to about 35 wt % of an unsaturated carboxylic acid, an unsaturated carboxylic acid anhydride, or a mixture of the unsaturated carboxylic acid and the unsaturated carboxylic acid anhydride, about 5 to about 40 wt % of a styrene compound, about 5 to about 40 wt % of an epoxy compound, about 0.1 to about 10 wt % of an isobornyl compound, and about 20 to about 40 wt % of a dicyclopentadiene compound, based on the total weight of unsaturated carboxylic acid, unsaturated carboxylic acid anhydride, styrene compound, isobornyl compound, and dicyclopentadiene compound.

In an embodiment, the unsaturated carboxylic acid includes at least one of an acrylic acid, a methacrylic acid, a crotonic acid, an itaconic acid, a maleic acid, a fumaric acid, a citraconic acid, a mesaconic acid, and a cinnamic acid.

In an embodiment, the styrene compound includes at least one of styrene, α-methyl styrene, m-methyl styrene, p-methyl styrene, and vinyl toluene.

In an embodiment, the epoxy compound includes at least one of glycidyl(meth)acrylate, α-n-propylglycidyl(meth)acrylate, α-n-butylglycidyl(meth)acrylate, β-ethylglycidyl(meth)acrylate, 3,4-epoxybutyl(meth)acrylate, 6,7-epoxyheptyl(meth)acrylate, o-vinylbenzyl glycidyl ether, m-vinylbenzyl glycidyl ether, and p-vinylbenzyl glycidyl ether.

In an embodiment, the isobornyl compound includes at least one of isobornyl(meth)acrylate, cyclohexyl(meth)acrylate, 2-methylcyclohexyl(meth)acrylate, dicyclopentanyloxyethyl(meth)acrylate, phenyl(meth)acrylate, benzyl(meth)acrylate, and 2-hydroxyethyl(meth)acrylate.

In an embodiment, the dicyclopentadiene compound includes at least one of dicyclopentenyloxyethyl acrylate, dicyclopentenyl(meth)acrylate, tris-2-acryloxyethyl isocyanurate, pentamethylpiperidyl(meth)acrylate, and ethylene oxide bisphenol A (meth)acrylate.

In an embodiment, the resin composition further includes about 0.01 to about 15 wt % of a polymerization initiator based on the total weight of unsaturated carboxylic acid, unsaturated carboxylic acid anhydride, styrene compound, isobornyl compound, and dicyclopentadiene compound.

In an embodiment, the polymerization initiator includes at least one of 2,2'-azobis(2-amidinopropane)dihydrochloride, 2,2'-azobis(2-methylbutyronitrile), 2,2'-azobis(isobutyronitrile), 2,2'-azobis(2,4-dimethylvaleronitrile), 2,2'-azobis(4-methoxy-2,4-dimethylvaleronitrile), 2,2'-azobis(4-cyanovaleric acid), and dimethyl 2,2'-azobisisobutyrate.

In another embodiment, a method of manufacturing a resin composition for an organic insulating layer includes manufacturing a copolymer solution by polymerizing about 5 to about 40 wt % of an unsaturated carboxylic acid, an unsaturated carboxylic acid anhydride, or a mixture of the unsaturated carboxylic acid and the unsaturated carboxylic acid anhydride, about 5 to about 40 wt % of a styrene compound, about 5 to about 40 wt % of an epoxy compound, about 0.1 to about 10 wt % of an isobornyl compound, about 20 to about 40 wt % of a dicyclopentadiene compound, and about 0.01 to about 15 wt % of a polymerization initiator, based on the total weight of unsaturated carboxylic acid, unsaturated carboxylic acid anhydride, styrene compound, isobornyl compound, and dicyclopentadiene compound, and purifying the copolymer solution.

In an embodiment, the manufacturing of the copolymer solution includes manufacturing a solution containing any one of the unsaturated carboxylic acid, the unsaturated carboxylic acid anhydride, and the mixture of the unsaturated carboxylic acid and the unsaturated carboxylic acid anhydride, the styrene compound, the epoxy compound, the isobornyl compound, the dicyclopentadiene compound, and the polymerization initiator, and heating the solution.

In an embodiment, the heating of the solution is performed at about 40 to about 80° C.

In an embodiment, the heating of the solution is performed for about 4 to 48 hours at a rate of about 100 to about 500 rpm.

In an embodiment, the method of manufacturing the resin composition for the organic insulating layer further includes adding about 0.001 to about 1 wt % of a polymerization inhibitor after the heating of the solution to finish polymerization.

In an embodiment, the polymerization inhibitor includes at least one of lactone, phosphite, and phosphonite not having a phenol group.

In an embodiment, the method of manufacturing the resin composition for the organic insulating layer further includes dissolving the copolymer resin in a solvent after the purifying of the copolymer resin.

In an embodiment, the solvent includes at least one of propionate, methanol, propylene glycol monoethyl acetate, propylene glycol monoethyl propionate, butyl acetate, ethyl lactate, carbitol, and propylene glycol methylethyl ether.

In another embodiment, a display panel includes a substrate, a plurality of thin film patterns that are formed on the substrate, and an insulating layer that is formed on the thin film patterns. The insulating layer includes a copolymer resin formed by polymerizing about 5 to about 35 wt % of an unsaturated carboxylic acid, an unsaturated carboxylic acid anhydride, or a mixture the unsaturated carboxylic acid and the unsaturated carboxylic acid anhydride, about 5 to about 40 wt % of a styrene compound, about 5 to about 40 wt % of an epoxy compound, about 0.1 to about 10 wt % of an isobornyl compound, and about 20 to about 40 wt % of a dicyclopentadiene compound based on the total weight of unsaturated carboxylic acid, unsaturated carboxylic acid anhydride, styrene compound, isobornyl compound, and dicyclopentadiene compound.

In an embodiment, the thin film patterns includes gate lines having gate electrodes, a gate insulating layer formed on the gate lines, a semiconductor layer formed on a predetermined region of a surface of the gate insulating layer opposite the gate lines, data lines that are formed on a surface of each of the gate insulating layer and the semiconductor layer and have source electrodes, and drain electrodes that are spaced apart from the source electrodes so as to face the source electrodes.

In another embodiment, the display panel further includes pixel electrodes that are connected to the drain electrodes on the insulating layer.

DETAILED DESCRIPTION OF THE INVENTION

Figure 1:
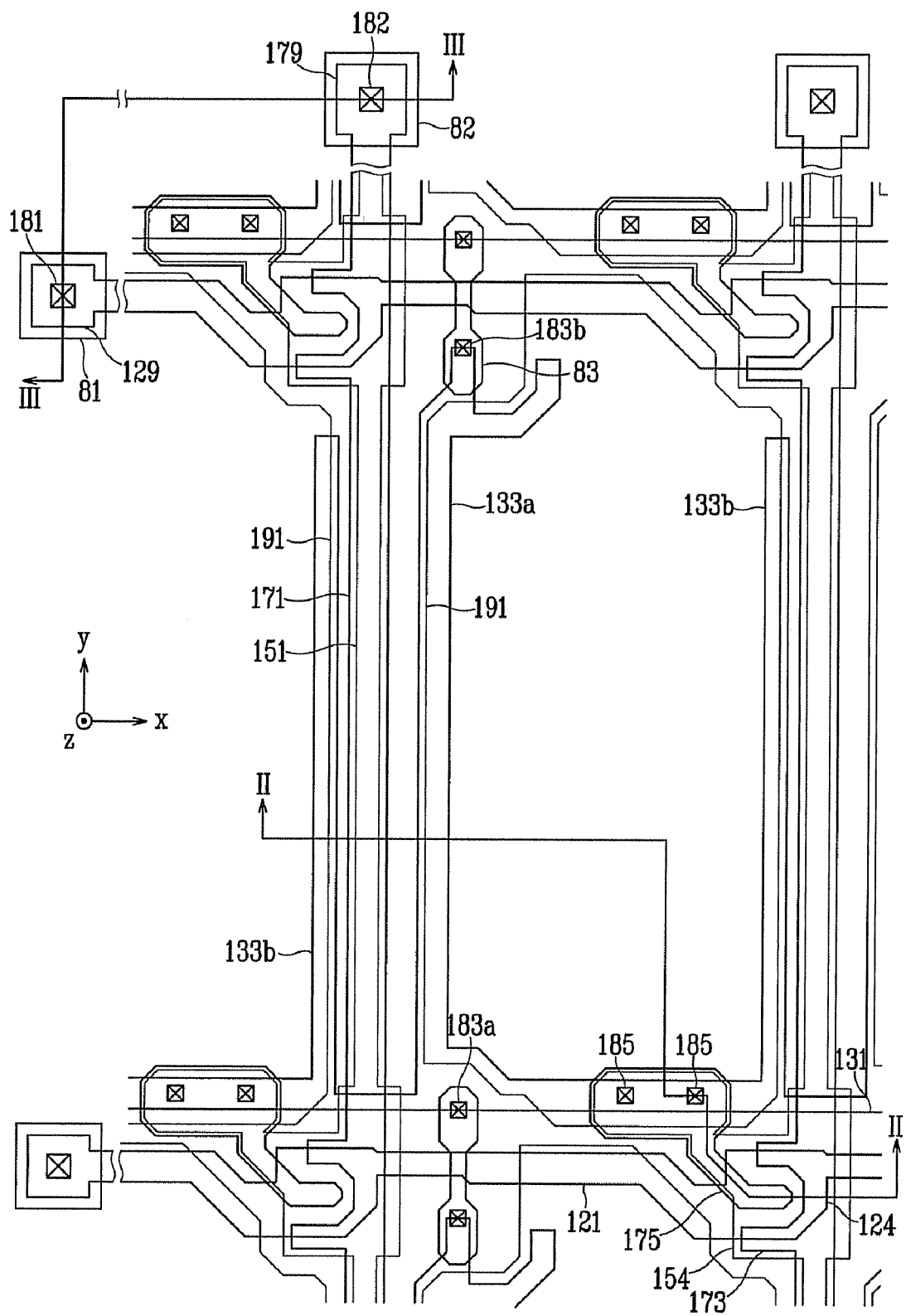
FIG. 1 is a layout view illustrating a structure of an exemplary thin film transistor array panel according to an exemplary embodiment.

Hereinafter, a resin composition for an organic insulating layer (also referred to herein as an "insulating layer") according to an embodiment of the present invention will be described in detail.

It will be understood in the following disclosure of the present invention, that as used herein, the singular forms "a", "an" and "the" are intended to include the plural forms as well, unless the context clearly indicates otherwise. It will be further understood that the terms "comprise", "comprises", and "comprising," when used in this specification, specify the presence of stated features, integers, steps, operations, elements, components, and combination of the foregoing, but do not preclude the presence and/or addition of one or more other features, integers, steps, operations, elements, components, groups, and combination of the foregoing.

It will be understood that when an element is referred to as being "on" another element, or when an element is referred to as being "disposed between" two or more other elements, it can be directly on (i.e., in at least partial contact with) the other element(s), or an intervening element or elements may be present therebetween. In contrast, when an element is referred to as being "disposed on" another element, the elements are understood to be in at least partial contact with each other, unless otherwise specified. Spatially relative terms, such as "between", "in between" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. The device may be otherwise oriented (rotated 90 degrees, inverted, or at other orientations) and the spatially relative descriptors used herein interpreted accordingly. Likewise, use of the term "opposite", unless otherwise specified, means on the opposing side or surface of the element. For example, where a surface of a layer is said to be opposite another surface or element, it is located on the opposing surface of the layer coplanar with the first surface unless otherwise specified.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The resin composition according to an embodiment includes an acrylic copolymer resin.

The acrylic copolymer resin is obtained by polymerizing: an unsaturated carboxylic acid, an unsaturated carboxylic acid anhydride, or a mixture thereof; a styrene compound; an epoxy compound; an isobornyl compound; and a dicyclopentadiene compound.

Examples of the unsaturated carboxylic acid or the unsaturated carboxylic acid anhydride include, but are not limited to, an acrylic acid, a methacrylic acid, a crotonic acid, an itaconic acid, a maleic acid, a fumaric acid, a citraconic acid, a mesaconic acid, a cinnamic acid, anhydrides thereof, or a mixture thereof.

In a specific embodiment, acrylic acid, methacrylic acid, or a maleic acid anhydride are useful.

In an embodiment, the unsaturated carboxylic acid, the unsaturated carboxylic acid anhydride, or the mixture thereof is included in the acrylic copolymer resin in an amount of about 5 to 35 wt % based on the total weight of unsaturated carboxylic acid, unsaturated carboxylic acid anhydride, styrene compound, isobornyl compound, and dicyclopentadiene compound, wherein the sum of the weight percentages of each of these foregoing components comprises, upon copolymerization, the total solids content of the acrylic copolymer resin based on copolymerization reactivity and solubility of the acrylic copolymer resin in an alkali aqueous solution.

Examples of the styrene compound include, but are not limited to, styrene, α-methyl styrene, m-methyl styrene, p-methyl styrene, vinyl toluene, or a mixture thereof.

It is preferable that the styrene compound is included in the acrylic copolymer resin in an amount of about 5 to 40 wt % based on the total weight of unsaturated carboxylic acid, unsaturated carboxylic acid anhydride, styrene compound, isobornyl compound, and dicyclopentadiene compound.

Examples of the epoxy compound include, but are not limited to, glycidyl (meth)acrylate, α-n-propyl glycidyl (meth)acrylate, α-n-butyl glycidyl(meth)acrylate, β-ethyl glycidyl(meth)acrylate, 3,4-epoxy butyl(meth)acrylate, 6,7-epoxy heptyl(meth)acrylate, o-vinyl benzyl glycidyl ether, m-vinyl benzyl glycidyl ether, p-vinyl benzyl glycidyl ether, or a mixture thereof.

When the epoxy compound is used in the copolymerization in an amount of about 5 to 40 wt % based on the total weight of unsaturated carboxylic acid, unsaturated carboxylic acid anhydride, styrene compound, isobornyl compound, and dicyclopentadiene compound, the copolymerization reactivity of the foregoing unsaturated monomers, adhesion of patterns formed from the acrylic copolymer resin, and heat resistance of the acrylic copolymer resin can increase.

Examples of the isobornyl compound include, but are not limited to, isobornyl(meth)acrylate, cyclohexyl(meth)acrylate, 2-methylcyclohexyl (meth)acrylate, dicyclopentanyloxyethyl(meth)acrylate, phenyl(meth)acrylate, benzyl (meth)acrylate, 2-hydroxyethyl(meth)acrylate, or a mixture thereof.

In an embodiment, the isobornyl compound is included in the acrylic copolymer resin in an amount of about 0.1 to 10 wt % based on the total weight of unsaturated carboxylic acid, unsaturated carboxylic acid anhydride, styrene compound, isobornyl compound, and dicyclopentadiene compound. If the content of isobornyl compound is more than about 10 wt %, a large amount of sublimable substance may be formed that can be observed to sublime upon an increase in baking temperature of a cast film of the acrylic copolymer resin.

Examples of the dicyclopentadiene compound include, but are not limited to, dicyclopentenyloxyethyl acrylate, dicyclopentenyl(meth)acrylate, tris-2-acryloxyethyl isocyanurate, pentamethylpiperidyl(meth)acrylate, ethylene oxide bisphenol A (meth)acrylate, or a mixture thereof.

In an embodiment, the dicyclopentadiene compound is included in the acrylic copolymer resin in an amount of about 20 to 40 wt % based on the total weight of unsaturated carboxylic acid, unsaturated carboxylic acid anhydride, styrene compound, isobornyl compound, and dicyclopentadiene compound.

Polymerization of the unsaturated carboxylic acid, the unsaturated carboxylic acid anhydride, or the mixture thereof, the styrene compound, the epoxy compound, the isobornyl compound, and the dicyclopentadiene compound is initiated by a polymerization initiator.

Examples of the polymerization initiator include, but are not limited to, a peroxide or azo compound, for which examples of the azo compound include but are not limited to 2,2'-azobis(2-amidinopropane)dihydrochloride, 2,2'-azobis (2-methylbutyronitrile), 2,2'-azobis(isobutyronitrile), 2,2'-azobis(2,4-dimethylvaleronitrile), 2,2'-azobis(4-methoxy-2, 4-dimethylvaleronitrile), 2,2'-azobis(4-cyanovaleric acid), or dimethyl 2,2'-azobisisobutyrate.

In an embodiment, the polymerization initiator is included in an amount of about 0.01 to 15 wt % based on the total weight of unsaturated carboxylic acid, unsaturated carboxylic acid anhydride, styrene compound, isobornyl compound, and dicyclopentadiene compound. If the content of the polymerization initiator is less than about 0.01 wt %, molecular weight becomes too high, whereas if the content of polymerization initiator is greater than about 15 wt %, the molecular weight can become too low. Thus, the shape of the pattern that can result from either too high or too low of a molecular weight can be undesirable, and the developing ability of a film of the acrylic copolymer resin and the rate of film thickness loss can deteriorate (i.e., increase).

The unsaturated carboxylic acid, the unsaturated carboxylic acid anhydride, or the mixture thereof, the styrene compound, the epoxy compound, the isobornyl compound, the dicyclopentadiene compound, and the polymerization initiator are dissolved in a solvent, and the acrylic copolymer resin can thereby be produced by polymerizing in solution.

Examples of solvents that can be used as a polymerization solvent include, but are not limited to, methanol, tetrahydrofuran, ethylene glycol monomethyl ether, ethylene glycol monoethyl ether, methyl cellosolve acetate, ethyl cellosolve acetate, diethylene glycol monomethyl ether, diethylene glycol monoethyl ether, ethylene glycol dimethyl ether, ethylene glycol diethyl ether, ethylene glycol methyl ethyl ether, propylene glycol monoethyl ether, propylene glycol monoethyl ether, propylene glycol propyl ether, propylene glycol butyl ether, propylene glycol methyl ethyl acetate, propylene glycol ethyl ether acetate, propylene glycol propyl ether acetate, propylene glycol butyl ether acetate, propylene glycol methyl ethyl propionate, propylene glycol ethyl ether propionate, propylene glycol propyl ether propionate, propylene glycol butyl ether propionate, toluene, xylene, methyl ethyl ketone, cyclohexanone, 4-hydroxy 4-methyl 2-pentanone, methyl acetate, ethyl acetate, propyl acetate, butyl acetate, ethyl 2-hydroxypropionate, methyl 2-hydroxy 2-methylpropionate, ethyl 2-hydroxy-2-methylpropionate, methyl hydroxyacetate, ethyl hydroxyacetate, butyl hydroxyacetate, methyl lactate, ethyl lactate, propyl lactate, butyl lactate, methyl 3-hydroxypropionate, ethyl 3-hydroxypropionate, propyl 3-hydroxypropionate, butyl 3-hydroxypropionate, methyl 2-hydroxy 3-methylbutanoate, methyl methoxy acetate, ethyl methoxy acetate, propyl methoxy acetate, butyl methoxy acetate, methyl ethoxy acetate, ethyl ethoxy acetate, propyl ethoxy acetate, butyl ethoxy acetate, methyl propoxy acetate, ethyl propoxy acetate, propyl propoxy acetate, butyl propoxy acetate, methyl butoxy acetate, ethyl butoxy acetate, propyl butoxy acetate, butyl butoxy acetate, methyl 2-methoxy propionate, ethyl 2-methoxy propionate, propyl 2-methoxy propionate, butyl 2-methoxy propionate, methyl 2-ethoxy propionate, ethyl 2-ethoxy propionate, propyl 2-ethoxy propionate, butyl 2-ethoxy propionate, methyl 2-butoxy propionate, ethyl 2-butoxy propionate, propyl 2-butoxy propionate, butyl 2-butoxy propionate, methyl 3-methoxy propionate, ethyl 3-methoxy propionate, propyl 3-methoxy propionate, butyl 3-methoxy propionate, methyl 3-ethoxy propionate, ethyl 3-ethoxy propionate, propyl 3-ethoxy propionate, butyl 3-ethoxy propionate, methyl 3-propoxy propionate, ethyl 3-propoxy propionate, propyl 3-propoxy propionate, butyl 3-propoxy propionate, methyl 3-butoxy propionate, ethyl 3-butoxy propionate, propyl 3-butoxy propionate, or butyl 3-butoxy propionate. The solvent can be used alone or as a mixture thereof.

The amount of the solvent is not limited, but may be about 1 to 10 times by weight of the total weight of unsaturated carboxylic acid, unsaturated carboxylic acid anhydride, styrene compound, isobornyl compound, and dicyclopentadiene compound.

Solution polymerization is performed at a predetermined temperature to prepare the acrylic copolymer resin solution.

When the solution polymerization is performed at a temperature higher than the 10 hour half-life temperature of the initiator, such as for an azo compound, a high yield may be obtained. In an embodiment, the solution polymerization is performed in a temperature range of about 40 to about 80° C., and more preferably in the range of about 45 to about 70° C. In connection with this, the solution polymerization can be performed for a time of about 4 to about 48 hours at a reaction agitation speed of about 100 to about 500 rpm, and more specifically about 150 to about 400 rpm.

A polymerization inhibitor can also be added to complete the solution polymerization. In an embodiment, the polymerization inhibitor includes, for example, a lactone, a phosphite, or a phosphonite not having a phenol group. The inhibitor is added in an amount of about 0.001 to about 1 wt % based on the total weight of unsaturated carboxylic acid, unsaturated carboxylic acid anhydride, styrene compound, isobornyl compound, and dicyclopentadiene compound. Further the polymerization inhibitor is used in an amount sufficient to reduce discoloration, increase thermal stability, and prolong storage stability of the acrylic copolymer resin.

Under the above-mentioned conditions, the percent conversion of the monomers to the acrylic copolymer in solution can be about 45 to 80 wt % of the total charge of unsaturated monomer during solution polymerization.

The acrylic copolymer solution that is polymerized through the above-mentioned procedure may be purified to produce the final acrylic copolymer resin.

A process of volatilizing unreacted monomers, polymerization initiator, and organic solvent from an acrylic copolymer solution in a high vacuum, a process of performing the polymerization reaction with an organic oxide radical initiator, or a process of dripping a copolymer solution onto an excess amount of non-solvent (i.e., a solvent in which the acrylic polymer resin is insoluble) and thereby precipitating the acrylic copolymer can be conducted to achieve the purification. Of the above-mentioned processes, the process of dripping the copolymer solution onto an excess of non-solvent and thereby precipitating the acrylic copolymer is preferred. This process may include dripping the copolymer solution onto a non-solvent, such as for example hexane, heptane, methanol, or water, to precipitate the polymer, filtering and collecting the polymer, and dissolving the resulting polymer in a solvent if necessary. The unreacted monomers and the polymerization initiator may be removed from the acrylic copolymer solution by the above-mentioned purification process to improve the acrylic copolymer resin quality and properties such as polydispersity.

The as-purified acrylic copolymer resin is dissolved in one or more solvents such as, for example, ethoxy ethyl propionate, methanol, propylene glycol monoethyl acetate, propylene glycol monoethyl propionate, butyl acetate, ethyl lactate, butyl carbitol, or propylene glycol methylethyl ether, to produce an acrylic copolymer resin solution.

A better understanding of the present invention may be obtained in light of the following Experimental Examples and exemplary embodiments that are set forth to illustrate, but are not to be construed to limit, the present invention.

Experimental Example 1

A solution that included, as unsaturated monomer, about 35 wt % of a methacrylic acid, about 5 wt % of styrene, about 30 wt % of glycidyl methacrylate, about 1 wt % of isobornyl methacrylate, about 29 wt % of dicyclopentenyloxyethyl acrylate, and about 400 parts by weight of tetrahydrofuran (solvent) based on 100 parts by weight of the above-mentioned solids was put into a 1 L reaction vessel provided with a stirrer and a cooler. The solution was mixed in the vessel at a rate of about 400 rpm, and about 15 wt % of 2,2'-azobis(2,4-dimethylvaleronitrile) as an initiator was then added thereto based on the total amount of unsaturated monomer.

The vessel containing the resulting solution was slowly warmed to about 58° C., and maintained at this temperature for about 28 hours to produce a copolymer solution.

Next, about 500 ppm of phosphite was added as a polymerization inhibitor to complete the polymerization.

Subsequently, about 5,000 parts by weight of hexane was added dropwise to the copolymer solution to precipitate the polymer, and filtration and collection of the polymer were then performed. Then, about 100 parts by weight of propionate was added thereto, and then the mixture was heated to about 30° C. to produce an acrylic copolymer resin.

Thus prepared acrylic copolymer resin was applied to a glass substrate, and pre-baked at about 100° C. for about 1 min to remove the solvent. Subsequently, the coated glass substrate was irradiated with UV rays having illumination power of about 15 mW/cm$^2$ at a wavelength of about 365 nm for about 15 sec and patterned using the mask having a pre-determined pattern, and was subsequently heat treated was performed in the oven at about 220° C. for about 60 min. to produce an insulating layer.

Experimental Example 2

The procedure of Experimental Example 1 was repeated to produce an acrylic copolymer resin and an insulating layer, with the exception that the composition contained about 35 wt % of a methacrylic acid, about 5 wt % of styrene, about 30 wt % of glycidyl methacrylate, about 5 wt % of isobornyl methacrylate and about 25 wt % of dicyclopentenyloxyethyl acrylate.

Experimental Example 3

The procedure of Experimental Example 1 was repeated to produce an acrylic copolymer resin and an insulating layer, with the exception that the composition contained about 35 wt % of a methacrylic acid, about 5 wt % of styrene, about 30 wt % of glycidyl methacrylate, about 15 wt % of isobornyl methacrylate and about 15 wt % of dicyclopentenyloxyethyl acrylate.

Experimental Example 4

The procedure of Experimental Example 1 was repeated to produce an acrylic copolymer resin and an insulating layer, with the exception that the composition contained about 35 wt % of a methacrylic acid, about 5 wt % of styrene, about 30 wt % of glycidyl methacrylate about 20 wt % of isobornyl methacrylate and about 10 wt % of dicyclopentenyloxyethyl acrylate.

Experimental Example 5

The procedure of Experimental Example 1 was repeated to produce an acrylic copolymer resin and an insulating layer, with the exception that the composition contained about 35 wt % of a methacrylic acid, about 5 wt % of styrene, about 30 wt % of glycidyl methacrylate, about 25 wt % of isobornyl methacrylate and about 5 wt % of dicyclopentenyloxyethyl acrylate.

Experimental Example 6

The procedure of Experimental Example 1 was repeated to produce an acrylic copolymer resin and an insulating layer, with the exception that the composition contained about 35 wt % of a methacrylic acid, about 5 wt % of styrene, about 30 wt % of glycidyl methacrylate, and about 30 wt % of isobornyl methacrylate but no dicyclopentenyloxyethyl acrylate.

unsaturated monomer contents of the Experimental Examples 1 to 6 are summarized in Table 1.

TABLE 1

| Unsaturated Monomer | Experimental Example No. | | | | | |
|---|---|---|---|---|---|---|
| | 1 | 2 | 3 | 4 | 5 | 6 |
| methacrylic acid | 35 | 35 | 35 | 35 | 35 | 35 |
| styrene | 5 | 5 | 5 | 5 | 5 | 5 |
| glycidyl methacrylate | 30 | 30 | 30 | 30 | 30 | 30 |
| isobornyl methacrylate | 1 | 5 | 15 | 20 | 25 | 30 |
| dicyclopentenyloxyethyl acrylate | 29 | 25 | 15 | 10 | 5 | 0 |
| 2,2'-azobis(2,4-dimethylvaleronitrile) | 15 | 15 | 15 | 15 | 15 | 15 | unit: wt % based on the total unsaturated monomer content

The insulating layer of Experimental Examples 1 and 2 includes the resin composition according to the present invention, and Experimental Examples 3 to 6 are Comparative Examples.

The outgassing amount of the insulating layer formed in Experimental Examples 1 to 6 was measured using the following procedure.

First, the layers that were formed in Experimental Examples 1 to 6 were separated using a knife to provide samples in an amount of about 30 mg. The amount of reduction in weight of the sample was measured using thermogravimetric analysis (TGA) equipment at about 220° C. for about 60 min under isothermal conditions. The case where the amount of reduction in weight (as a percentage of the total weight of the sample) was less than about 0.5 wt % is shown by the symbol 'O', the case where the reduction amount in weight was about 0.5 to about 1.5 wt % is shown by the symbol 'Δ', and the case where the amount of reduction in weight was more than about 1.5 wt % is shown by the symbol 'x'.

The results are shown in Table 2.

TABLE 2

| | Experimental Example No. | | | | | |
|---|---|---|---|---|---|---|
| | 1 | 2 | 3 | 4 | 5 | 6 |
| Outgassing | O | Δ | X | X | X | X |

From Table 2, it was confirmed that the degree of outgassing was desirable in the case of the resin compositions according to Experimental Examples 1 and 2 and the outgassing amount was large in the case of the resin compositions according to Experimental Examples 3 to 6 (comparative).

Further, display panels that included the insulating layers produced in Experimental Examples 1, 3, and 5 were formed according to the exemplary embodiments as described below, and the incidental images formed in the display panels were evaluated.

The incidental image was tested using the following procedure. First, the display panels for testing also including the insulating layers according to Experimental Examples 1, 3, and 5 were prepared. A plurality of pixels were disposed in the display panel for testing in the check pattern. First, gray data voltage that did not correspond to a white or black color was applied to the display panel as a test to measure the luminance of the screen, a portion of the pixels alternately disposed in terms of length and breadth was blackened, and the rest of the pixels were whitened. The resulting display panel was left for about 10 hours. Subsequently, the gray data voltage was applied to measure the luminance of the screen. Thereby, evaluation of an incidental image was performed.

The occurrence of an incidental image depending on time was numerically evaluated using a predetermined formula, and the results are described in Table 3.

TABLE 3

| | Experimental Example 1 | Experimental Example 3 | Experimental Example 5 |
|---|---|---|---|
| 2 hours | 0.6 | 2.6 | 2.2 |
| 4 hours | 0.6 | 2.5 | 2.6 |
| 6 hours | 0.7 | 2.3 | 3.0 |
| 8 hours | 0.6 | 2.2 | 3.4 |
| 10 hours | 0.7 | 2.0 | 3.7 |
| 14 hours | 0.8 | 2.0 | 3.7 |

In Table 3, the lower the numeral is, the smaller the outgassing amount of the insulating layer corresponding to the Experimental Example. A lower numeral means that the insulating layer is desirable. Therefore, from Table 3, it is confirmed that the insulating layer of Experimental Example 1, having the lowest numeral, is useful.

EMBODIMENTS

The present invention now will be described more fully hereinafter with reference to the accompanying drawings, in which preferred embodiments of the present invention are shown. As those skilled in the art will realize, the described embodiments may be modified in various different ways, all without departing from the spirit or scope of the present invention.

In the present exemplary embodiment, a description will be given of a thin film transistor array panel that includes an insulating layer formed of the above-mentioned resin composition and a method of manufacturing the thin film transistor array panel referring to FIGS. 1 to 15.

First, with reference to FIGS. 1 to 3, a structure of a thin film transistor array panel according to an exemplary embodiment of the present invention will be described.

Figure 2:
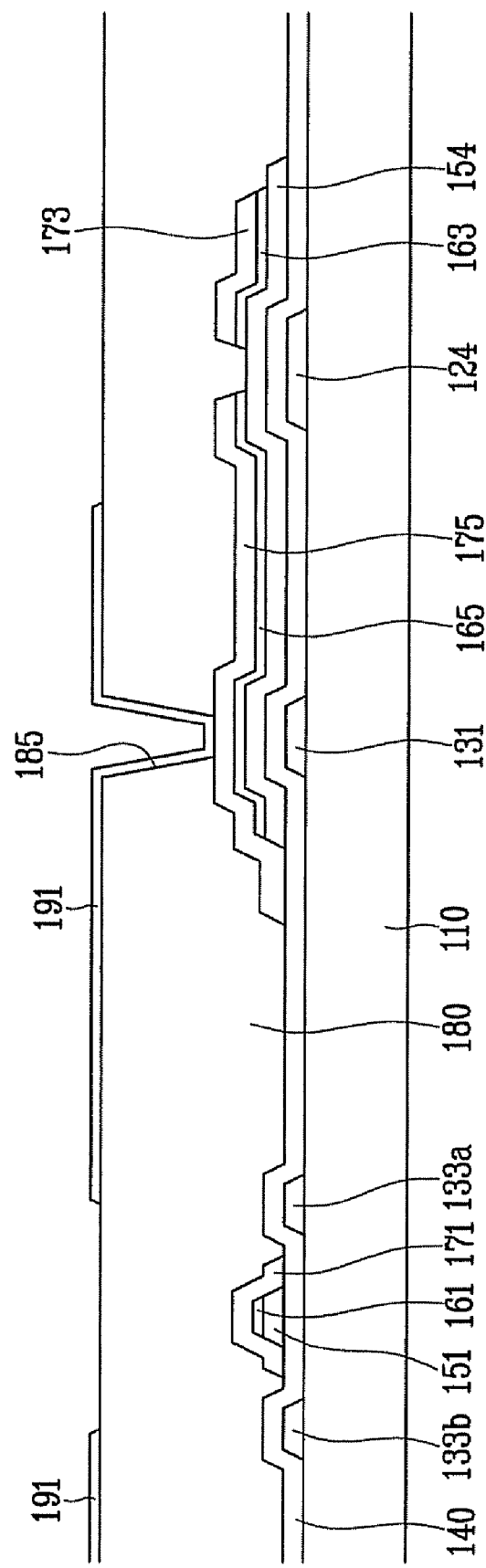
FIGS. 2 and 3 are sectional views of the exemplary thin film transistor array panel of FIG. 1 taken along the lines II-II and II-II.
Figure 3:
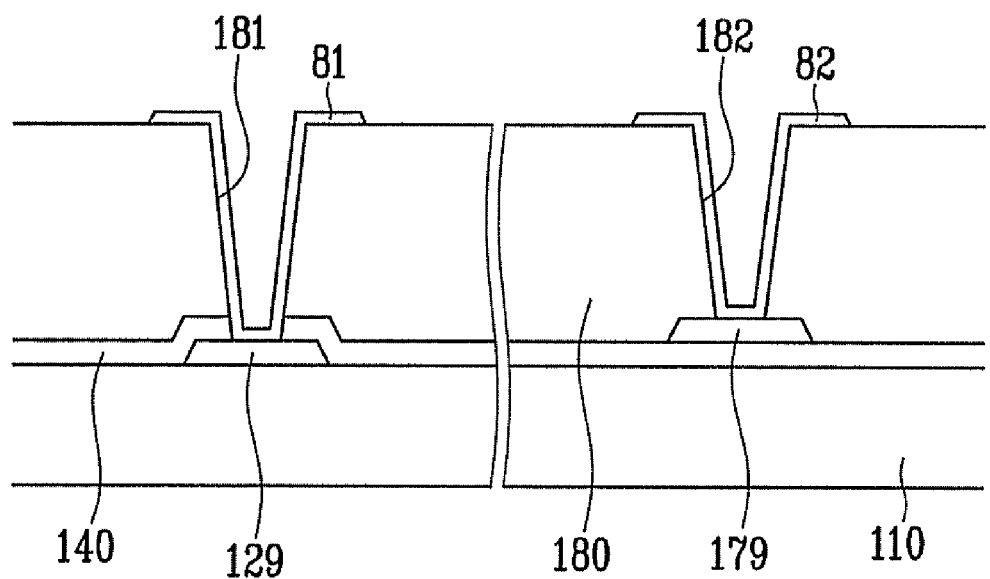

FIG. 1 is a layout view illustrating the structure of the thin film transistor array panel according to an exemplary embodiment, and FIGS. 2 and 3 are sectional views of the thin film transistor array panel of FIG. 1 taken along the lines II-II and II-II.

A plurality of gate lines 121 (FIG. 1) and a plurality of storage electrode lines 131 (FIGS. 1, 2) are formed on a surface of an (underlying) insulating substrate 110 (FIGS. 2, 3) made of, for example, transparent glass or plastic.

The gate lines 121 transmit gate signals, and extend substantially in a horizontal direction (i.e., the x-direction as shown in FIG. 1.). Each of the gate lines 121 includes a plurality of gate electrodes 124 (FIGS. 1, 2) protruding downward and an end portion 129 (FIGS. 1, 3) having a large area so as to be connected to another layer or an external driving circuit. A gate driving circuit (not shown) for generating gate signals may be mounted on a flexible printed circuit film (not shown) attached on the underlying substrate 110, may be directly mounted on the underlying substrate 110, or may be integrated onto the underlying substrate 110. When the gate driving circuit is integrated onto the substrate 110, the gate lines 121 may extend so as to be directly connected to the gate driving circuit.

A predetermined voltage is applied to the storage electrode lines 131, and the storage electrode lines 131 include a stem line extending almost parallel to the gate lines 121 and a plurality of pairs of storage electrodes 133a (FIGS. 1, 2) and 133b (FIGS. 1, 2) branched from the stem line. Each of the storage electrode lines 131 is provided between two adjacent gate lines 121, and the stem line is closer to the lower one of the two adjacent gate lines 121. Each of the storage electrodes 133a and 133b includes a fixed end connected to the stem line, and a free end that is on the opposite side. The fixed end of the storage electrode 133b has a large area, and the free end is divided into a straight portion and a bent portion. However, the shape and arrangement of the storage electrode lines 131 may be modified in various ways.

The gate lines 121 and the storage electrode lines 131 may be made of an aluminum-containing metal, such as aluminum (Al) or an aluminum alloy, a silver-containing metal, such as silver (Ag) or a silver alloy, a copper-containing metal, such as copper (Cu) or a copper alloy, a molybdenum-containing metal, such as molybdenum (Mo) or a molybdenum alloy, chromium (Cr), nickel (Ni), tantalum (Ta), or titanium (Ti).

The side surfaces of the gate lines 121 and the storage electrode lines 131 are inclined with respect to a surface of the substrate 110, and the inclination angle between the side surfaces and the substrate may be in a range of about 30 to 80°.

A gate insulating layer 140 (FIGS. 2, 3) made of, for example, silicon nitride ($SiN_x$) or silicon oxide ($SiO_2$) is formed on the gate lines 121 and the storage electrode lines 131.

A plurality of semiconductor stripes 151 (FIGS. 1, 2) made of hydrogenated amorphous silicon (simply referred to as "a-Si") or polysilicon are formed on the gate insulating layer 140. The semiconductor stripes 151 extend substantially in a vertical direction (i.e., orthogonal to the x-y plane in the z direction, coming out of the plane of FIG. 1), and include a plurality of projections 154 (FIGS. 1, 2) protruding toward the gate electrodes 124. Each of the semiconductor stripes 151 has a large width in the vicinity of the gate lines 121 and the storage electrode lines 131 so as to cover the gate lines 121 and the storage electrode lines 131.

A plurality of ohmic contact stripes and islands 161 (FIG. 2) and 165 (FIG. 2) are formed on the semiconductor stripes 151. The ohmic contact stripes and islands 161 and 165 may be made of n+ hydrogenated amorphous silicon in which an n-type impurity, such as phosphorus (P), is doped with a high concentration, or silicide. The ohmic contact stripes 161 include a plurality of protrusions 163 (FIG. 2), and the protrusions 163 and the ohmic contact islands 165 are provided in pairs on the projections 154 of the semiconductor stripes 151.

The side surfaces of the semiconductor stripes 151 and the ohmic contact stripes and islands 161 and 165 are inclined with respect to the surface of the substrate 110, and the internal inclination angle between the side surfaces and the substrate 110 is in a range of about 30 to 80°.

A plurality of data lines 171 (FIGS. 1, 2) and a plurality of drain electrodes 175 (FIGS. 1, 2) are formed on the ohmic contact stripes and islands 161 and 165 and the gate insulating layer 140.

The data lines 171 transmit data signals, and extend substantially in a vertical direction so as to cross the gate lines 121. Furthermore, each of the data lines 171 crosses the storage electrode lines 131 to be formed between the adjacent storage electrodes 133a and 133b. Each of the data lines 171 includes a plurality of source electrodes 173 (FIGS. 1, 2) extending toward the gate electrodes 124 and an end portion 179 (FIGS. 1, 3) having a large area so as to be connected to another layer or an external driving circuit.

The drain electrodes 175 are separated from the data lines 171, and face the source electrodes 173 with the gate electrodes 124 therebetween. Each of the drain electrodes 175 includes an end portion having a large width, and the other end portion has a bar shape. The end portion having the large width overlaps a storage electrode line 131, and the other end portion having the bar shape is partially surrounded by the source electrodes 173 that are bent in a U shape.

A gate electrode 124, a source electrode 173, a drain electrode 175, and a projection 154 of the semiconductor stripes 151 form a thin film transistor ("TFT"), and a channel of the thin film transistor is formed in the projection 154 between the source electrode 173 and the drain electrode 175.

Like the gate lines 121, the data lines 171 and the drain electrodes 175 may be made of various metallic materials or conductors.

The side surfaces of the data lines 171 and the drain electrodes 175 are inclined with respect to the surface of the substrate 110, and the internal inclination angle between the side surfaces and the substrate may be in a range of about 30 to 80°.

A passivation layer 180 (FIGS. 2, 3) is formed on the data lines 171, the drain electrodes 175, and the portions of the projection 154 exposed to the outside.

The passivation layer 180 is made of the above-mentioned acrylic copolymer resin (i.e., the organic insulating layer disclosed hereinabove), and a surface of the passivation layer 180 may be planarized. In an embodiment, the passivation layer 180 may have a double-layer structure including a lower inorganic layer and an upper organic layer, such that it does not damage the exposed portions of the semiconductor stripes 151 while providing excellent insulating characteristics of an organic layer.

The passivation layer 180 has pluralities of contact holes 182 (FIGS. 1, 3) and 185 (FIGS. 1, 2) that expose the end portions 179 of the data lines 171 and the drain electrodes 175, respectively. Furthermore, each of the passivation layer 180 and the gate insulating layer 140 has a plurality of contact holes 181 (FIGS. 1, 3) that expose the end portions 129 of the gate lines 121 and a plurality of contact holes 183a and 183b that expose a portion of the storage electrode lines 131 in the vicinity of the fixed end of the storage electrodes 133b.

A plurality of pixel electrodes 191 (FIGS. 1, 2), a plurality of overpasses 83 (FIG. 1), and a plurality of contact assistants 81 and 82 (FIGS. 1, 3) are formed on the passivation layer 180.

The pixel electrodes 191 are physically and electrically connected to the drain electrodes 175 through the contact holes 185, and data voltages are applied to the pixel electrodes 191 from the drain electrodes 175.

The pixel electrodes 191 overlap the storage electrodes 133a and 133b and the storage electrode lines 131. A pixel electrode 191 and a drain electrode 175 electrically connected to the pixel electrode 191 overlap a storage electrode line 131 so as to form a capacitor. The capacitor is referred to as a storage capacitor, and the storage capacitor improves the voltage holding performance of the liquid crystal capacitor.

The contact assistants 81 and 82 are connected to the end portions 129 of the gate lines 121 and the end portions 179 of the data lines 171 through the contact holes 181 and 182, respectively. The contact assistants 81 and 82 improve the adhesive property between the end portions 179 of the data lines 171 and an external device, and between the end portions 129 of the gate lines 121 and an external device. Further, the contact assistants 81 and 82 protect the end portions 179 of the data lines 171 and the end portions 129 of the gate lines 121.

The overpasses 83 cross the gate lines 121, and are connected through the contact holes 183a and 183b, between which the gate lines 121 are provided, to the exposed portions of the storage electrode lines 131 and to the exposed end portions of the free end of the storage electrodes 133b. The storage electrodes 133a and 133b and the storage electrode lines 131 may be used along with the overpasses 83 to repair defects of the gate lines 121, the data lines 171, or the thin film transistors.

Hereinafter, a method of manufacturing the thin film transistor array panel shown in FIGS. 1 to 3 will be described in detail referring to FIGS. 4 to 15.

Figure 4:
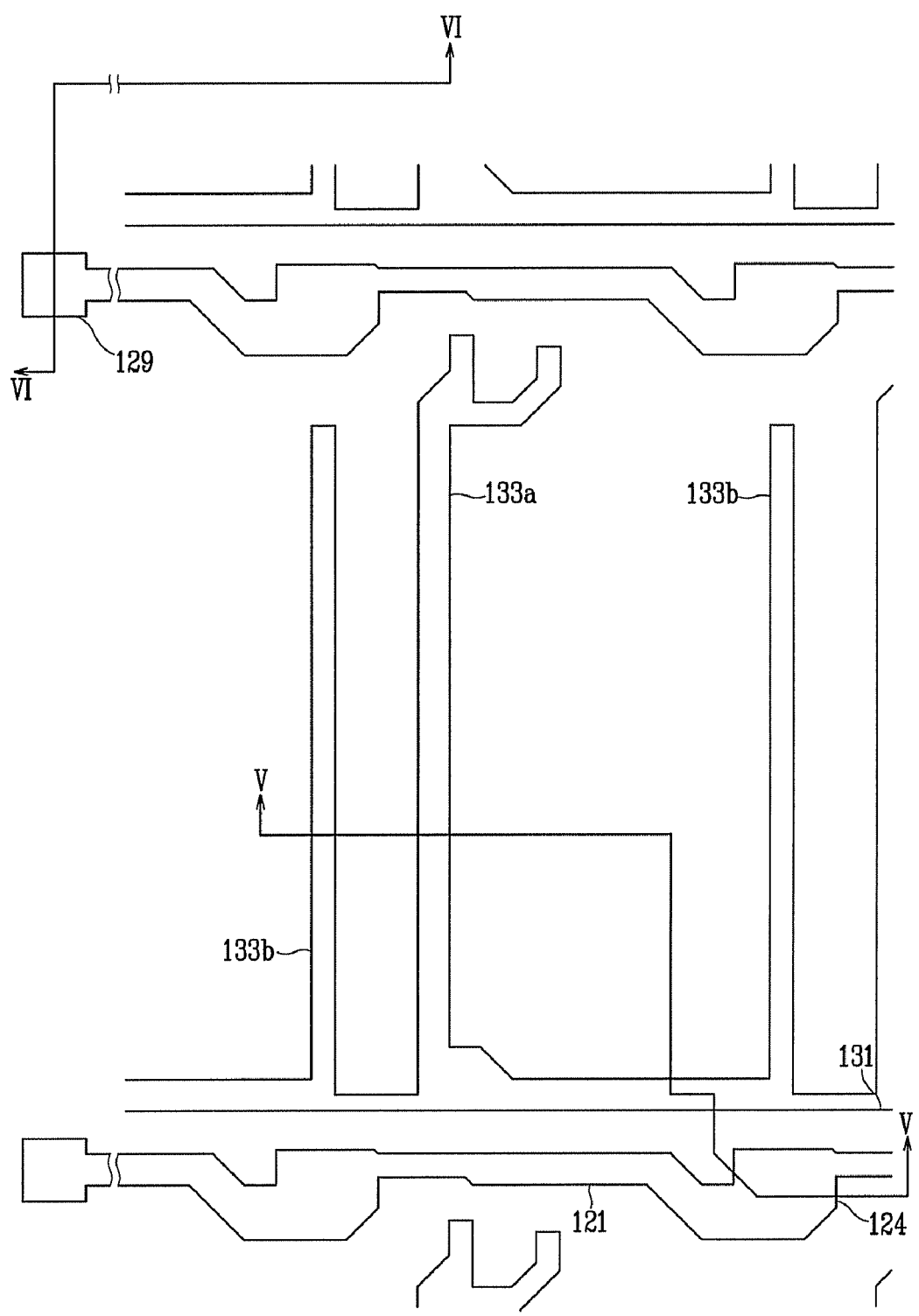
FIGS. 4, 7, 10, and 13 are layout views sequentially illustrating the manufacturing process of the exemplary thin film transistor array panel according to the exemplary embodiment of the present invention.
Figure 5:
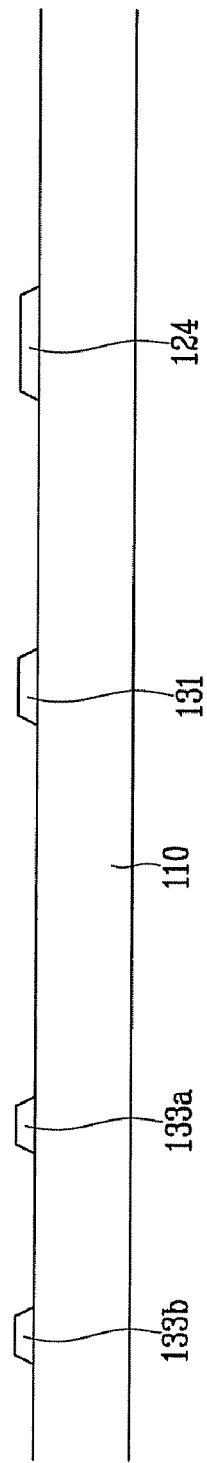
FIGS. 5 and 6 are sectional views of the exemplary thin film transistor array panel of FIG. 4 taken along the lines V-V and VI-VI.
Figure 6:
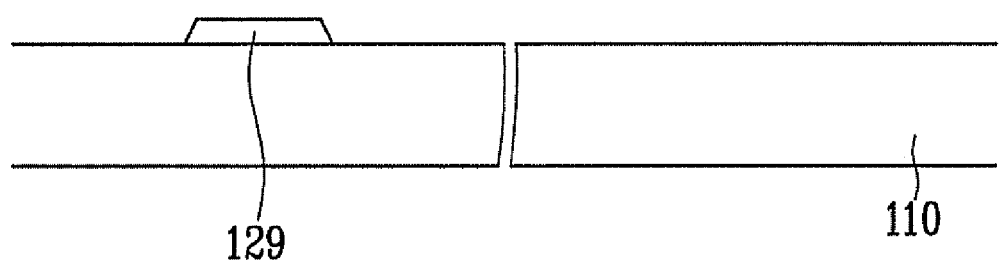
Figure 7:
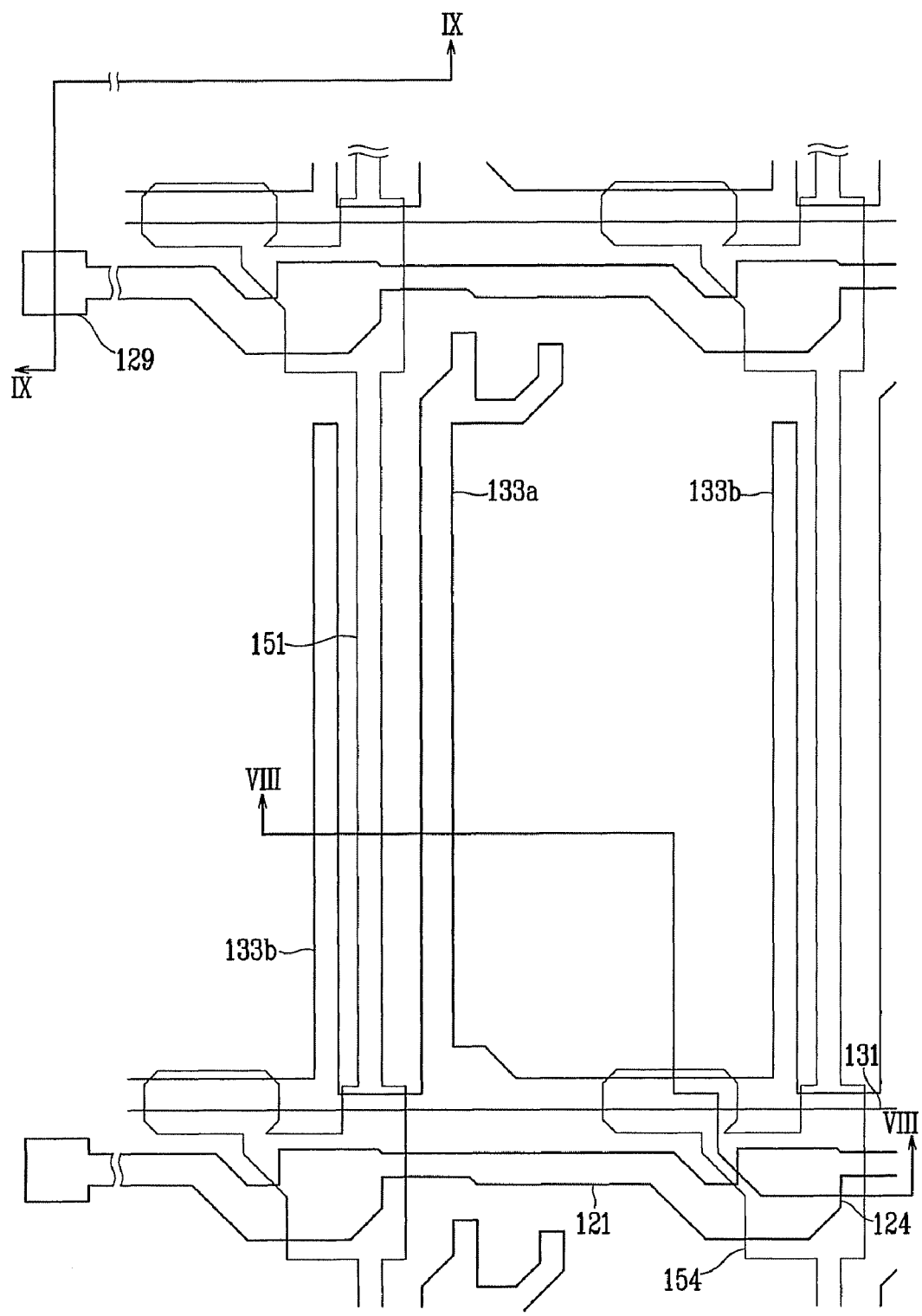
Figure 8:
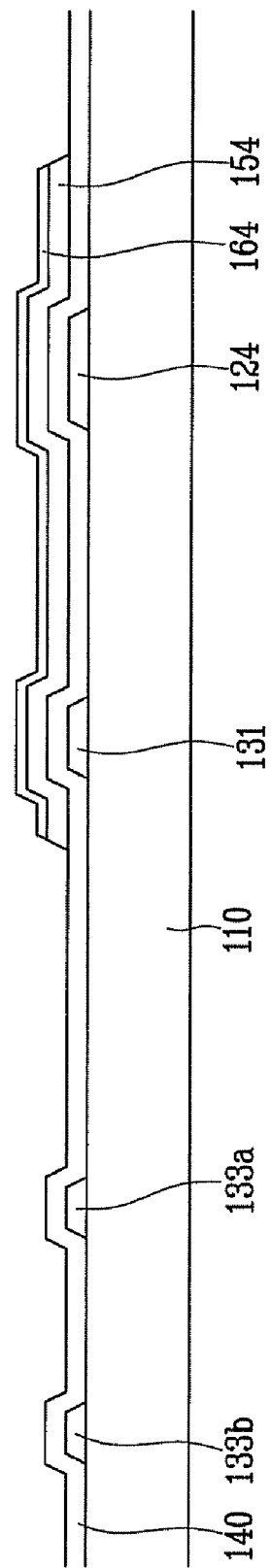
FIGS. 8 and 9 are sectional views of the exemplary thin film transistor array panel of FIG. 7 taken along the lines VIII-VIII and IX-IX.
Figure 9:
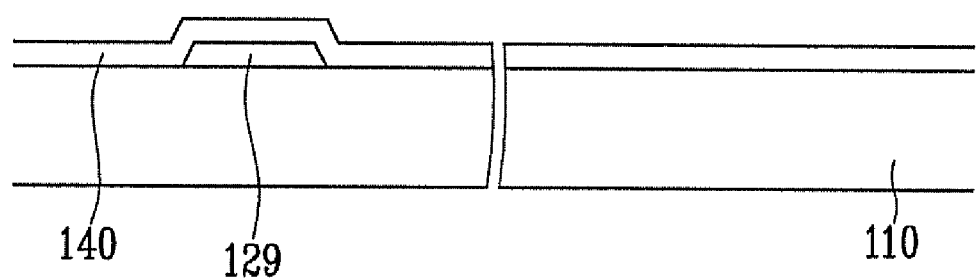
Figure 10:
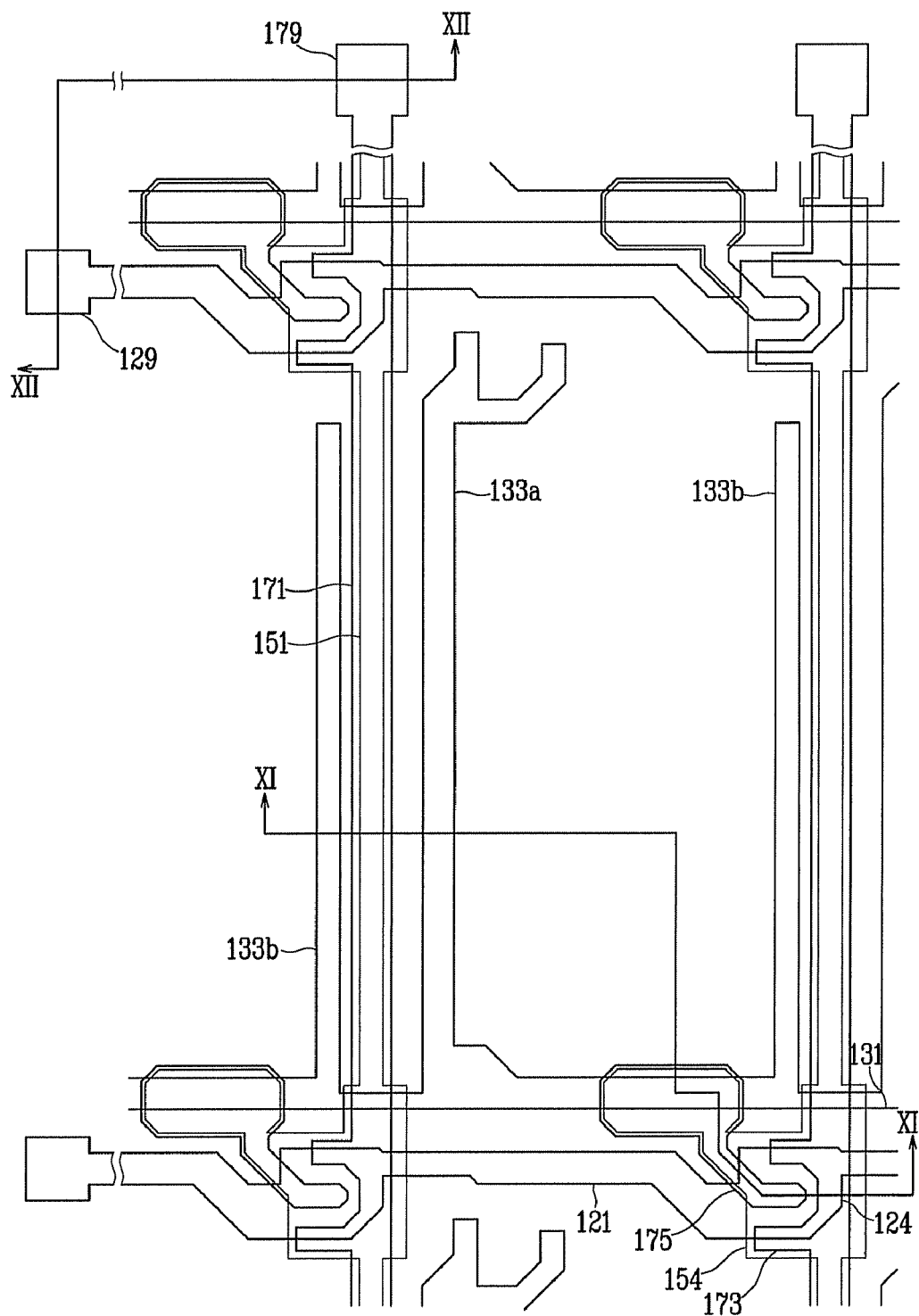
Figure 11:
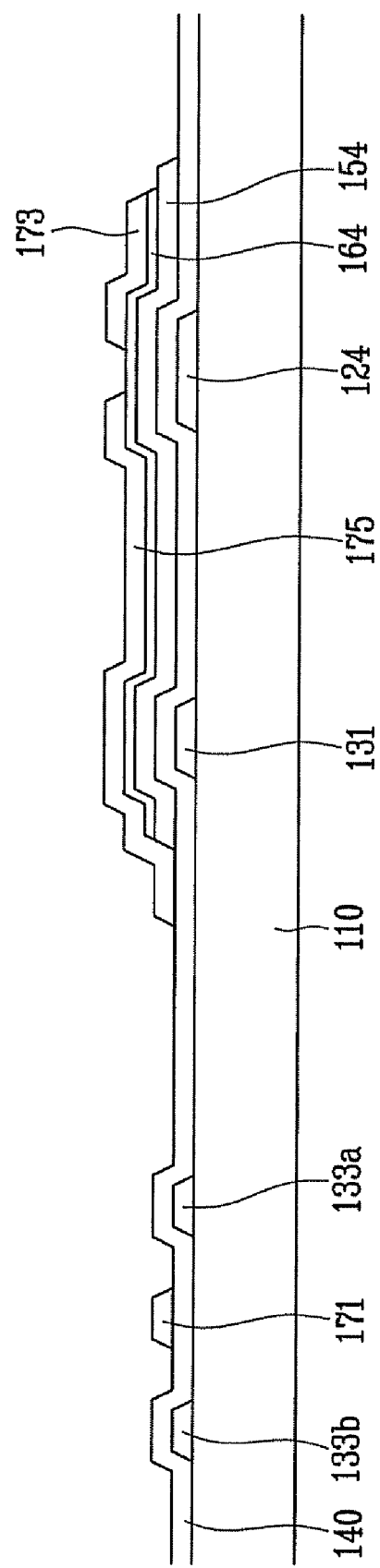
FIGS. 11 and 12 are sectional views of the exemplary thin film transistor array panel of FIG. 10 taken along the lines XI-XI and XII-XII.
Figure 12:
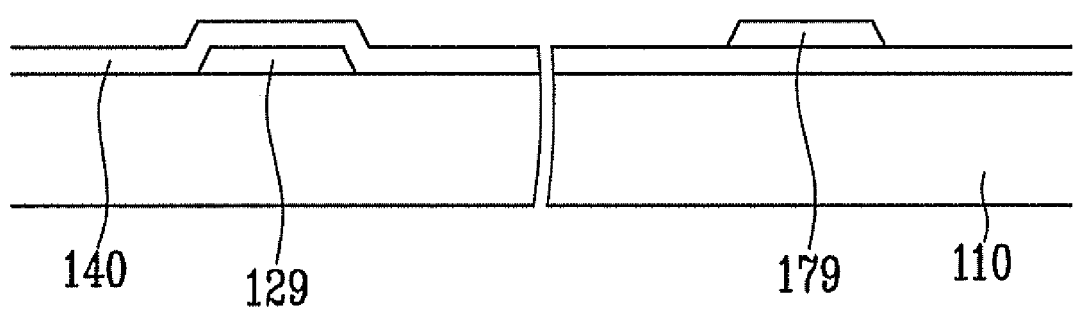
Figure 13:
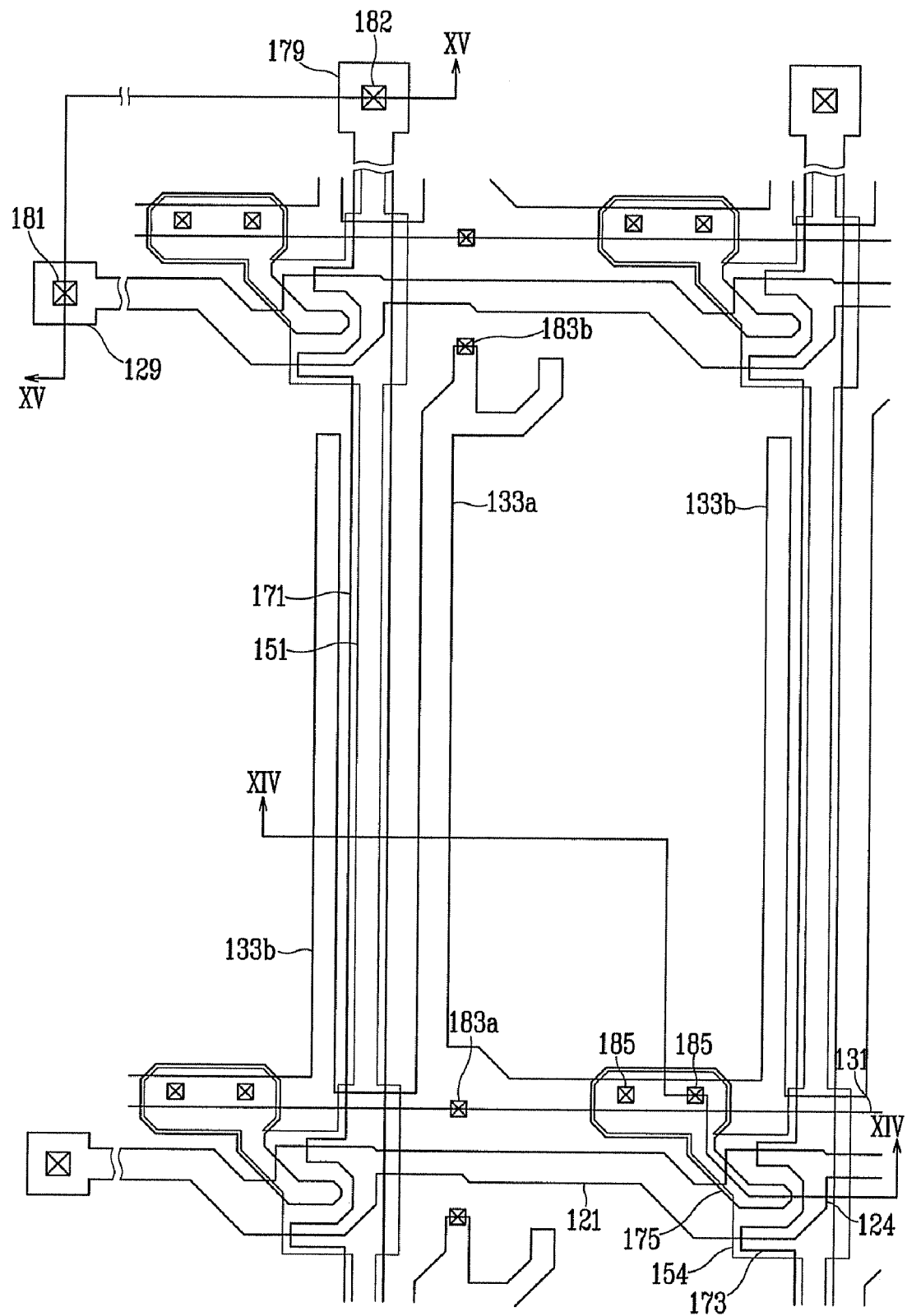
Figure 14:
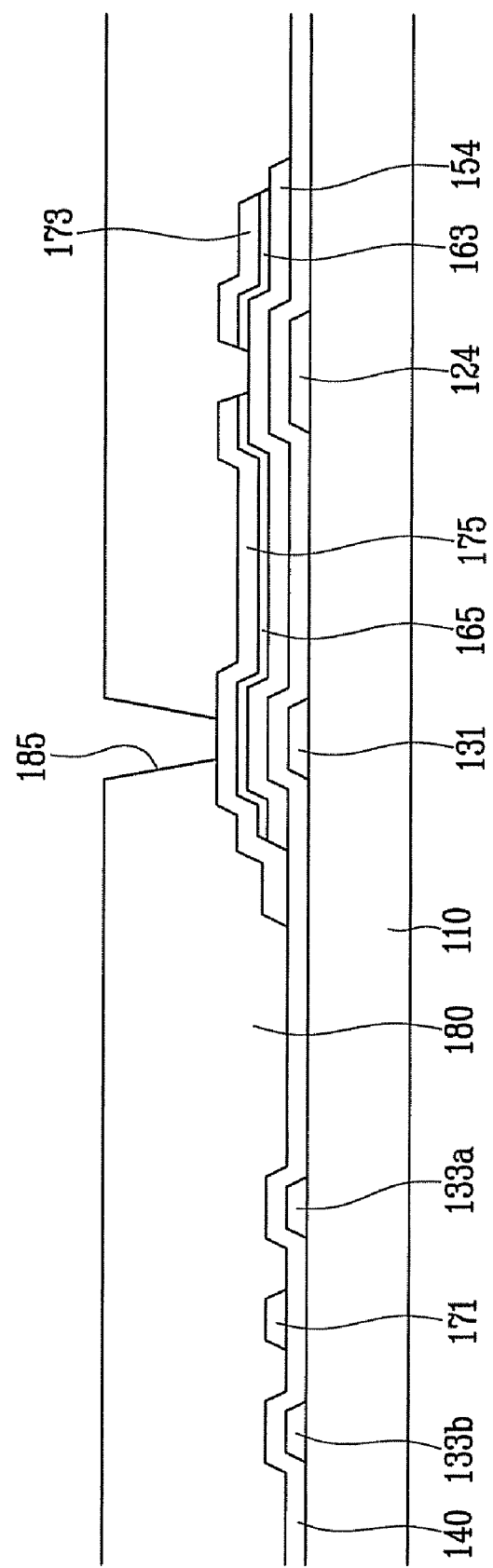
FIGS. 14 and 15 are sectional views of the exemplary thin film transistor array panel of FIG. 13 taken along the lines XIV-XIV and XV-XV.
Figure 15:
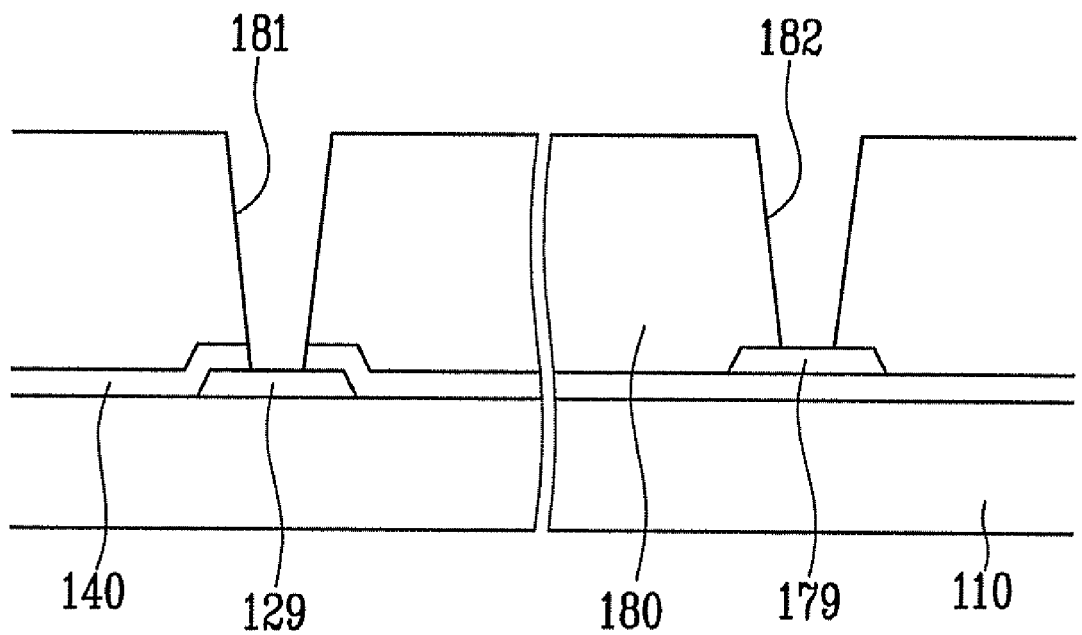

FIGS. 4, 7, 10, and 13 are layout views sequentially illustrating the manufacturing process of the thin film transistor array panel according to the exemplary embodiment of the present invention, FIGS. 5 and 6 are sectional views of the thin film transistor array panel of FIG. 4 taken along the lines V-V and VI-VI, FIGS. 8 and 9 are sectional views of the thin film transistor array panel of FIG. 7 taken along the lines VIII-VIII and IX-IX, FIGS. 11 and 12 are sectional views of the thin film transistor array panel of FIG. 10 taken along the lines XI-XI and XII-XII, and FIGS. 14 and 15 are sectional views of the thin film transistor array panel of FIG. 13 taken along the lines XIV-XIV and XV-XV.

First, as shown in FIGS. 4 to 6, a metal layer is layered on the insulating substrate 110 (FIGS. 5, 6) using sputtering, and subjected to a photolithography process to form the gate lines 121 (FIG. 4) including the gate electrodes 124 (FIGS. 4, 5) and the end portions 129 (FIGS. 4, 6) and the storage electrode lines 131 (FIGS. 4, 5) including the storage electrodes 133a and 133b (both in FIGS. 4, 5).

Next, as shown in FIGS. 7 to 9, the gate insulating layer 140 (FIGS. 8, 9), an intrinsic amorphous silicon (a-Si) layer (not shown), and an amorphous silicon (n+a-Si) layer (not shown) that is doped with the impurity are continuously deposited on the gate lines 121 (FIG. 7) including the gate electrodes 124 (FIG. 8) and the end portions 129 (FIG. 9) and on the storage electrodes 133a and 133b (FIGS. 7, 8) using plasma enhanced chemical vapor deposition ("PECVD"), and then dry etched to form the semiconductor stripes 151 including the projections 154 and the impurity semiconductor layers 164 (FIG. 8).

Next, as shown in FIGS. 10 to 12, the metal layer is formed on the gate insulating layer 140 (FIGS. 11, 12) and the impurity semiconductor layers 164 (FIG. 11) by sputtering, and subjected to the photolithography and etch process to form the data lines 171 (FIGS. 10, 11) including the source electrodes 173 (FIGS. 10, 11) and the end portions 179 (FIGS. 10, 12), and the drain electrodes 175 (FIGS. 10, 11).

Next, as shown in FIGS. 13 to 15, the exposed impurity semiconductor layers 164 (from FIG. 11) that are not covered with the source electrodes 173 (FIGS. 13, 14) and the drain electrodes 175 (FIGS. 13, 14) are removed to create a plurality of ohmic contact stripes 161 (FIG. 13) having a plurality of protrusions 163 (FIG. 14) and a plurality of ohmic contact islands 165 (FIG. 14), and to partially expose the projection 154 (FIGS. 13, 14) of the semiconductor stripes below them. In this case, oxygen ($O_2$) plasma is performed to stabilize the surface of the exposed portions of the projections 154.

Subsequently, the above-mentioned acrylic copolymer resin solution is applied to form the passivation layer 180 (FIGS. 14, 15), and the passivation layer 180 is exposed and developed to form a plurality of contact holes 181 (FIGS. 13, 15), 182 (FIGS. 13, 15), 183a (FIG. 13), 183b (FIG. 13), and 185 (FIGS. 13, 14).

Finally, as shown in FIGS. 1 to 3, a transparent conductive layer, such as ITO, is formed on the passivation layer 180, and subjected to the photolithography and etching process to form the pixel electrodes 191, the contact assistants 81 and 82, and the overpasses 83.

Heat resistance of the organic insulating layer is improved to prevent damage to the insulating layer during the subsequent process. Accordingly, it is possible to improve transmittance and adhesive properties of the organic insulating layer, and to prevent characteristic defects in displays prepared with the organic insulating layer, such as incidental image caused by outgassing from the insulating layer.

While this invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A resin composition for an organic insulating layer produced by polymerizing about 5 to about 35 wt % of an unsaturated carboxylic acid, an unsaturated carboxylic acid anhydride, or a mixture thereof, about 5 to about 40 wt % of a styrene compound, about 5 to about 40 wt % of an epoxy compound, about 0.1 to about 5 wt % of an isobornyl compound, and about 20 to about 40 wt % of a dicyclopentadiene compound based on the total weight of unsaturated carboxylic acid, unsaturated carboxylic acid anhydride, styrene compound, epoxy compound, isobornyl compound, and dicyclopentadiene compound.

2. The resin composition of claim 1, wherein the unsaturated carboxylic acid comprises at least one of an acrylic acid, a methacrylic acid, a crotonic acid, an itaconic acid, a maleic acid, a fumaric acid, a citraconic acid, a mesaconic acid, or a cinnamic acid.

3. The resin composition of claim 1, wherein the styrene compound comprises at least one of styrene, α-methyl styrene, m-methyl styrene, p-methyl styrene, or vinyl toluene.

4. The resin composition of claim 1, wherein the epoxy compound comprises at least one of glycidyl (meth)acrylate, α-n-propyl glycidyl (meth)acrylate, α-n-butyl glycidyl (meth)acrylate, β-ethyl glycidyl (meth)acrylate, 3,4-epoxy butyl (meth)acrylate, 6,7-epoxy heptyl (meth)acrylate, o-vinyl benzyl glycidyl ether, m-vinyl benzyl glycidyl ether, or p-vinyl benzyl glycidyl ether.

5. The resin composition of claim 1, wherein the isobornyl compound comprises isobornyl (meth)acrylate.

6. The resin composition of claim 1, further comprising:
about 0.01 to about 15 wt % of a polymerization initiator, based on the total weight of unsaturated carboxylic acid, unsaturated carboxylic acid anhydride, styrene compound, isobornyl compound, and dicyclopentadiene compound.

7. The resin composition of claim 6, wherein the polymerization initiator comprises at least one of 2,2'-azobis(2-amidinopropane)dihydrochloride, 2,2'-azobis(2-methylbutyronitrile), 2,2'-azobis(isobutyronitrile), 2,2'-azobis(2,4-dimethylvaleronitrile), 2,2'-azobis(4-methoxy-2,4-dimethylvaleronitrile), 2,2'-azobis(4-cyanovaleric acid), or dimethyl 2,2'-azobisisobutyrate.

8. A method of manufacturing a resin composition for an organic insulating layer, the method comprising:
preparing a copolymer solution by polymerizing about 5 to about 40 wt % of an unsaturated carboxylic acid, an unsaturated carboxylic acid anhydride, or a mixture thereof, about 5 to about 40 wt % of a styrene compound, about 5 to about 40 wt % of an epoxy compound, about 0.1 to about 5 wt % of an isobornyl compound, about 20 to about 40 wt % of a dicyclopentadiene compound, and about 0.01 to about 15 wt % of a polymerization initiator, wherein the amount of each of the foregoing is based on the total weight of unsaturated carboxylic acid, unsaturated carboxylic acid anhydride, styrene compound, epoxy compound, isobornyl compound, and dicyclopentadiene compound; and purifying the copolymer solution.

9. The method of claim 8, wherein the preparing of the copolymer solution comprises:

preparing a solution comprising the unsaturated carboxylic acid, the unsaturated carboxylic acid anhydride, or mixture thereof; the styrene compound; the epoxy compound; the isobornyl compound; the dicyclopentadiene compound; and the polymerization initiator, and heating the solution.

10. The method of claim 9, wherein the heating of the solution is performed at a temperature of about 40 to about 80° C.

11. The method of claim 10, wherein the heating of the solution is performed at a rate of about 100 to about 500 rpm for about 4 to about 48 hours.

12. The method of claim 9, further comprising adding about 0.001 to about 1 wt % of a polymerization inhibitor based on the total weight of unsaturated carboxylic acid, unsaturated carboxylic acid anhydride, styrene compound, epoxy compound, isobornyl compound, and dicyclopentadiene compound after the heating of the solution to finish polymerization.

13. The method of claim 12, wherein the polymerization inhibitor comprises at least one of lactone, phosphite, or phosphonite, each of which does not contain a phenol group.

14. The method of claim 8, further comprising dissolving the copolymer resin in a solvent after the purifying of the copolymer resin.

15. The method of claim 14, wherein the solvent comprises at least one of ethoxyethyl propionate, methanol, propylene glycol monoethyl acetate, propylene glycol monoethyl propionate, butyl acetate, ethyl lactate, butyl carbitol, or propylene glycol methylethyl ether.

16. A display panel comprising:

a substrate;

a plurality of thin film patterns that are formed on the substrate; and an insulating layer that is formed on the thin film patterns, wherein the insulating layer comprises a copolymer resin formed by polymerizing about 5 to 35 about wt % of an unsaturated carboxylic acid, an unsaturated carboxylic acid anhydride, or a mixture thereof, about 5 to about 40 wt % of a styrene compound, about 5 to about 40 wt % of an epoxy compound, about 1 to about 5 wt % of an isobornyl compound, and about 20 to about 40 wt % of a dicyclopentadiene compound based on the total weight of unsaturated carboxylic acid, unsaturated carboxylic acid anhydride, styrene compound, epoxy compound, isobornyl compound, and dicyclopentadiene compound.

17. The display panel of claim 16, wherein the thin film patterns comprise gate lines having gate electrodes, a gate insulating layer formed on the gate lines, a semiconductor layer formed on a predetermined region of the gate insulating layer, data lines that are formed on the gate insulating layer and the semiconductor layer and having source electrodes, and drain electrodes that are spaced apart from the source electrodes so as to face the source electrodes.

18. The display panel of claim 17, further comprising pixel electrodes that are connected to the drain electrodes on the insulating layer.

\* \* \* \* \*